UNITED STATES PATENT OFFICE.

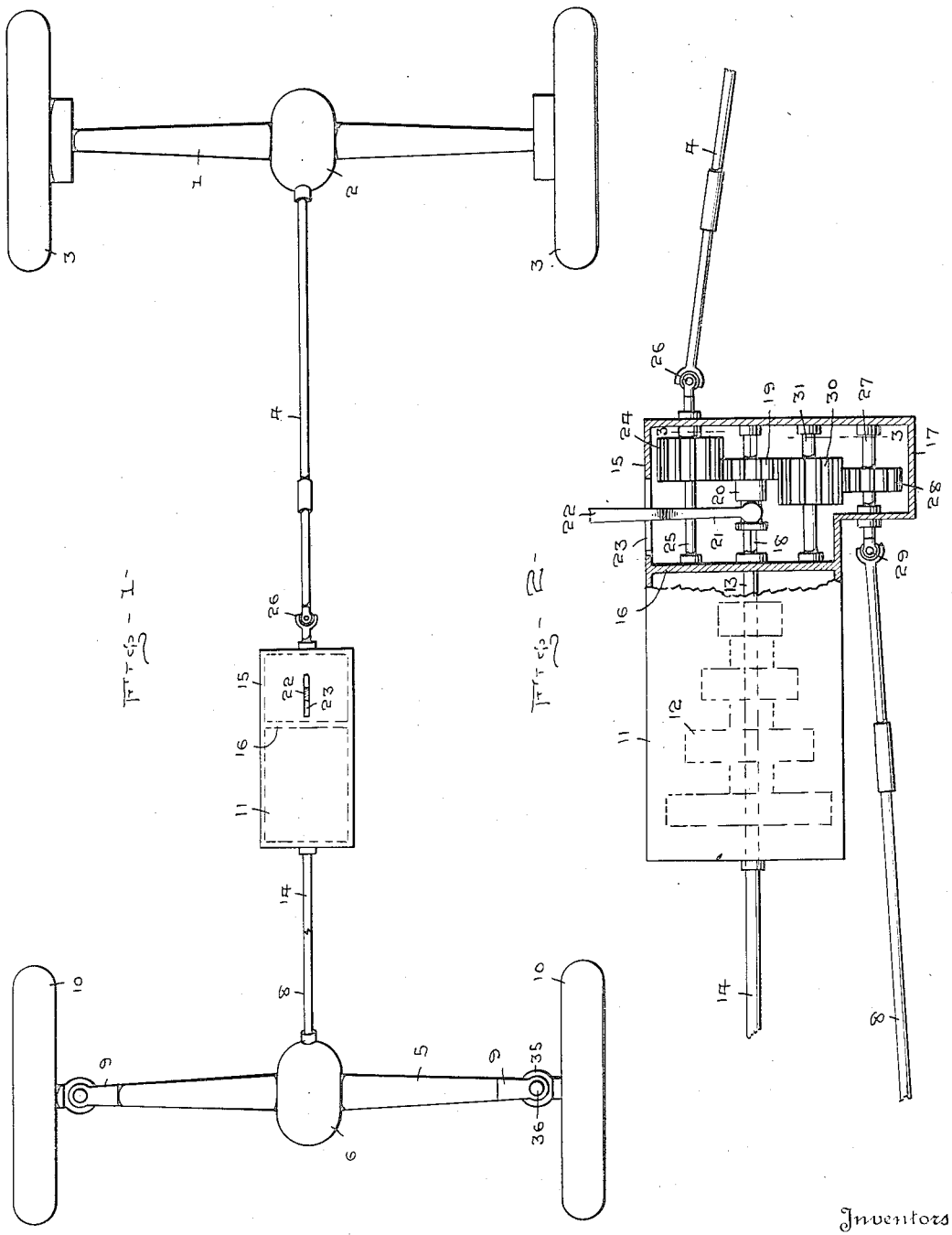

WILLIAM H. AHLE AND EDWARD L. FITZGERALD, OF GERALD, MISSOURI.

GEARING.

1,225,202. Specification of Letters Patent. Patented May 8, 1917.

Application filed April 24, 1916. Serial No. 93,163.

*To all whom it may concern:*

Be it known that we, WILLIAM H. AHLE and EDWARD L. FITZGERALD, citizens of the United States, residing at Gerald, in the county of Franklin and State of Missouri, have invented certain new and useful Improvements in Gearing; and we do hereby declare the following to be a full, clear, and exact description of the invention, such as will enable others skilled in the art to which it appertains to make and use the same.

This invention relates to a four wheel drive mechanism for automobiles and other vehicles, and has for one of its objects the provision of mechanisms whereby the rear wheels and the front wheels of a vehicle may be driven simultaneously with each other or the rear wheels or the front wheels may each be driven independently of the other.

Another object of this invention is the provision of mechanisms interposed between the changeable speed mechanisms of the vehicle and the driving shafts for operating the rear and front wheels thereof, provided with means for shifting the mechanisms for transmitting the driving power to either the rear wheels, or the front wheels, or both the rear and front wheels as desired.

These and other objects and advantages of this invention will more fully appear as the nature of the invention is more clearly understood from the following specification, the subject matter of the claim, and the views illustrated in the accompanying drawings, in which, Figure 1 is a top plan view of the running gear of a motor vehicle, showing the invention applied thereto and operatively connected with the engine shaft and the transmission shafts of the rear and front axles.

Fig. 2 is a side view of the invention, shown partly broken away and partly in section, showing the detail construction of the power shifting mechanisms.

Referring to the drawings wherein similar reference characters denote corresponding parts throughout the several views, 1 denotes the rear axle and 2 the differential gear housing, and within the axle 1 are the usual shafts upon the ends of which are the rear wheels 3, the wheels 3 being driven by the rear transmission shaft 4. The front axle 5 is also formed hollow or tubular and provided with the differential gear housing 6, and in the axle 5 are mounted front drive shafts 7, which are driven by the front transmission shaft 8, and swivelly mounted in the yokes 9 upon the ends of the front axle 5 are the front steering wheels 10 driven by these front drive shafts.

Suitably secured upon the vehicle between the rear axle 1 and the front axle 2 is a housing comprising the front casing 11, in which are mounted any suitable form of changeable speed gears 12 upon the speed gear shaft 13 and having geared connection with the engine shaft 14, and at the rear of the front casing 11 is the auxiliary casing 15 divided from the front casing 11 by the partition wall 16, the auxiliary casing 15 being provided at its bottom portion with the downwardly extending subcasing 17.

The speed gear shaft 13 projects through the partition wall 16 and across the auxiliary casing 15, and this portion of the speed gear shaft 13 within the auxiliary casing 15 is preferably formed square in cross section as at 18 and has slidably mounted thereon the gear 19 provided with the annular grooved hub 20, to which is connected the fork 21 of the shifting hand lever 22, which projects outwardly through the opening or slot 23 formed in the top of the auxiliary casing 15. Interposed between the gear 19 and the rear transmission shaft 4 is the gear 24 secured upon the shaft 25 revolubly mounted in the upper portion of the auxiliary casing 15 above the shaft 18 and is connected to the rear transmission shaft 4 by the knuckle 26. Revolubly mounted in the sub-casing 17 is the shaft 27 upon which is secured the gear 28, the shaft 27 projecting through the forward wall of the sub-casing 17 and is connected to the front transmission shaft 8 by the knuckle 29, and interposed between the gear 19 and the gear 28 is the idler or counter gear 30 secured upon the counter shaft 31 revolubly mounted in the lower portion of the auxiliary casing 15 beneath the speed gear shaft 18, but slightly to one side of the vertical alinement of the shafts 18 and 27.

The gear 24 and the idler or counter gear 30 are substantially the same width, but the gear 24 is secured upon the shaft 25 at the rear end of the casing 15 while the gear 30 is secured upon the counter shaft 31 substantially centrally thereof, thus the gears 24 and 30 are so mounted upon their respective shafts that the front end of the gear 24 will lie in a vertical plane cutting through the center of the gear 30, or in other words the front half of the gear 24 overhangs the rear half of the gear 30, the gear 30, however, is in constant mesh with the gear 28 which may be of any suitable width. The gear 19, however, is formed of substantially half of the widths of the gear 24 and the gear 30 and is slidably mounted upon the squared end 18 of the speed changing gear shaft 13, so that, when the gear 19 is in the position shown in Fig. 2 of the drawings, the power from the engine shaft 14 through the speed changing gears 12 and the gear 19 is transmitted through the gear 24 and the rear transmission shaft 4 to the rear wheels 3, and at the same time power is also transmitted through the counter gear 30 to the gear 28 and to the front transmission shaft 8 to the front or steering wheels 10, and by thus positioning the gear 19 with respect to the gears 24 and 30 the rear wheels 3 and the front wheels 10 are thus driven simultaneously by the same power. Should it be desired to drive only the rear wheels 3 of the vehicle, the lever 22 is manipulated in a manner for sliding the gear 19 rearwardly upon the shaft 18 so that the gear 19 becomes disengaged from the gear 30 but remains in mesh with the gear 24, whereby the rear wheels 3 are driven independently of the front wheels 10, or should it be desirous of driving only the front wheels 10, the lever 22 is manipulated in a manner for moving the gear 19 forwardly along the shaft 18 so that the gear 19 will become disengaged from the gear 24 but remain in mesh with the gear 30, whereby the front wheels 10 are driven independently of the rear wheels 3.

Having described our invention, what we claim as new and desire to secure by Letters Patent, is:—

In a four wheel drive motor vehicle, the combination with the power shaft thereof, of a main jack shaft disposed on each side of said power shaft, a pinion fixed upon each of said main jack shafts, a driving pinion feathered upon said power shaft, an auxiliary jack shaft, a pinion fixed upon said auxiliary jack shaft and meshing with the pinion upon one of said main jack shafts, oppositely extending drive shafts swivelly connected to the other of said main jack shafts and to said auxiliary jack shaft, and means for shifting said feathered pinion into mesh with either one or both of said main jack shaft pinions, whereby power may be transmitted to either one or both of said oppositely extending drive shafts.

In testimony whereof we have signed our names to this specification in the presence of two subscribing witnesses.

WILLIAM H. AHLE.
EDW. L. FITZGERALD.

Witnesses:
J. C. BURTEN,
F. W. SICKENDICK.